United States Patent Office 3,316,324
Patented Apr. 25, 1967

3,316,324
THERMOSETTING COMPOSITIONS CONTAINING A LIQUID RUBBER SELECTED FROM POLYSULFIDE, POLYMERCAPTAN, AND CHLORINATED POLYETHYLENE, TOGETHER WITH AN EPOXIDE AND CURING AGENT
Peter Mendoyanis, Fort Lee, N.J., assignor to Sika Chemical Corporation, Passaic, N.J., a corporation of New Jersey
No Drawing. Filed July 11, 1966, Ser. No. 564,006
8 Claims. (Cl. 260—830)

This application is a continuation-in-part application Serial No. 346,066, filed February 20, 1964, which is a continuation application Serial No. 58,649, filed September 27, 1960, now abandoned.

The present invention relates to novel thermosetting plastic compositions especially useful as adhesives for wood, metal, glass, concrete and the like and as sealants or crack fillers, and also provides a novel method and means for producing those compositions.

The plastic compositions of my invention are produced by simultaneously, yet independently, curing a glycidyl polyether resin and a liquid rubber, of the type hereinafter more fully described, while the resin and rubber constituents are intimately admixed.

The resultant cured product is a plastic mass composed of the two polymer constituents in an interlaced structure and having exceptional cohesive and adhesive Characteristics and which retains its cohesive and adhesive plastic properties over long periods of time without cracking or swelling and with a minimum of shrinkage, even under extreme temperature conditions.

In these compositions, the resin constituent contributes to the hardness and rapid curing and adhesive characteristics of the product and the rubber constituent enhances plasticity and cohesion and prolongs its plastic life.

Thermosetting resin compositions of the type to which the present invention relates set upon standing and therefore must be prepared by the addition of a curing agent just prior to their application, the proportioning of which may be relatively critical, especially with respect to the time period during which the composition remains in a workable condition, and can not ordinarily be entrusted to unskilled workmen. It is important, therefore, that the procedure be simplified and rendered as foolproof as possible.

As previously noted, the characteristics of the cured glycidyl polyether resins are, in accordance with my present invention, modified by simultaneously curing a liquid rubber intimately admixed therewith whereby there is produced a composite plastic composition having exceptional low temperature characteristics and which, for instance, may be extended 400% at 0° F. without rupture.

In accordance with one of its aspects, the invention comprises a thermosetting, two-component, co-curing system, one component comprising the glycidyl polyether resin and a curing agent for the rubber constituent and the other component comprising the rubber constituent and the curing agent for the resin constituent. The two components are stable until mixed but, upon mixing, as by stirring together, under ambient temperature conditions, the curing of each component is immediately initiated to produce the interlaced co-cured mixture of the glycidyl polyether resin and the liquid rubber.

Various fillers such as finely divided solids, e.g., calcium carbonate, asbestos, silica, talc, mica, and the like, and extenders or plasticizers such as aliphatic or aromatic hydrocarbons or natural oils containing epoxy groups may also be included in the system prior to curing, advantageously, though not necessarily, by premixing with either the resin or the rubber component.

These glycidyl polyether resins, used in accordance with the present invention, contain both ethereal oxygen and glycidyl groups, the latter in such portion that the resin has an epoxide equivalent within the range of 100 to 6000. It will be understood that reference to epoxy equivalent herein is indicative of the number of grams of resin containing one gram-equivalent of epoxy.

The glycidyl polyether resins, i.e., epoxy resins, used in accordance with the present invention may, with advantage, be prepared by reacting a dihydric phenol or a dihydric alcohol with epichlorohydrin in alkaline solution, resulting in a resinous material, which may be either liquid or solid at normal temperature, i.e., 20°–30° C.

In the production of these epoxy resins, any dihydric phenol or dihydric alcohol may be used, including mononuclear phenols, e.g., resorcinol, catechol, hydroquinone, or the like, or polynuclear phenols, e.g., bis-(4-hydroxyphenol)-2, 2-propane (bisphenol) or 4,4'-dihydroxybenzophenone or bis-(4-hydroxy-phenyl)-1, 1-ethane or bis-(4-hydroxy-phenyl)-1, 1-isobutane or bis-(4-hydroxyphenyl)-2, 2-butane or polyhydric alcohols, e.g., ethylene glycol, glycerol, dipropylene glycol, diglycerol, erythritol, pentaglycerol, mannitol, sorbitol, polyallyl alcohol, polyvinyl alcohol, or the like.

The presently preferred epoxy resins for use in accordance with the present invention are those having an epoxide equivalent within the range of 150 to 500, and particularly those prepared by reacting epichlorohydrin with bis-phenol A, i.e.,

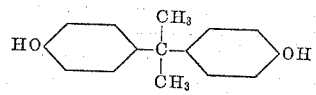

As the curing agent for these glycidyl polyether resins, there may be used either an aliphatic or an aromatic primary, secondary or tertiary amine, for instance, benzyl dimethyl amine, dimethylaminomethyl phenol, 2,4,6-tri-(dimethylaminomethyl) phenol, ethylene diamine, ethylene triamine, diethylene triamine, 3-dimethylamino propylamine, 3-diethylaminopropylamine, triethylene tetramine, tetraethylene pentamine, or the like.

As an alternative, polyamides may be used as the curing agent for the glycidyl polyether. Polyamides suitable for this purpose may, for instance, be produced by reacting a polymeric fatty acid with an aliphatic polyamine. Polymeric fatty acids suitable for this purpose may be produced by the polymerization of drying oils or semi-drying oils, such as soybean, linseed, tung, perilla, oiticica, cottonseed, corn, tall, sunflower, dehydrated castor oil, or the like.

The resultant polymeric fatty acids, with or without other polybasic acids having at least two carbonyl groups which are separated by at least three and not more than eight carbon atoms, for instance, glutaric, adipic, pimalic, suberic, azelaic, sebasic, terephthalic or isophthalic acids, are reacted with an aliphatic polyamine, for instance, ethylene diamine, diethylene triamine, triethylene tetramine, tetraethylene pentamine, 1,4-diaminobutane, 1,3-diaminobutane, hexamethylene diamine, 3-(N-isopropylamine) propylamine, 3,3'-iminobispropylamine, or the like to produce the polyamide curing agent. Polyamide resins especially suitable for this purpose are those having an amine value within the range of 150–400, which is indicative of the number of milligrams of KOH equivalent to base content of one gram of the polyamide.

As the liquid rubber constituent, I use a liquid linear rubber polymer capable of forming cross-linkages on curing. One especially desirable type of liquid rubber for this purpose is the well-known polysulfide rubber produced by reacting bis(2-chloroethyl)formal with sodium bisulfide in the presence of a small amount of trichloroopane, for instance, 2 mole percent of 1,2,3-trichloropropane and 98 mole percent of the di(chloroethyl) formal. The resultant liquid polymers are capable of cross-linking by reason of terminal thiol groups, the polymer being structurally represented by the following formula:

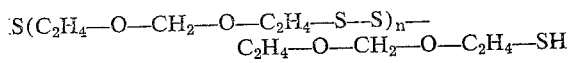

Suitable rubber polymers of this type are those in which $n$ is an integer within the range of 3 to 23, the viscosity of the polymer varying within a range of about 250–45,000 cps. Polymers of this type found especially advantageous for use in accordance with the present invention are those having a viscosity of about 40,000 cps, $n$ approximating 23.

Equally suitable polymercaptan resins are those which have the following basic chemical structure:

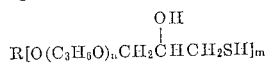

wherein $n$ is an integer from 20 to 25, $m$ is an integer from 2 to 3 and R is an aliphatic hydrocarbon radical. The most suitable polymercaptan resin of this type is a medium viscosity, clear liquid having the following specification.

*Table I*

| | |
|---|---|
| Mercaptan equivalent (meq. SH/g.) | 0.38 |
| Viscosity (poises), Brookfield RVT, @ 25° C., #6 spindle 20/100 r.p.m. | 50 |
| pH (water/methanol) | 8.5 |
| Water content (percent), (Dean-Stark) | 0.05 |
| Color (Gardner Hellige) | 2 |
| Specific gravity | 1.03 |
| Weight/gallon (pounds) | 8.5 |
| Appearance: Clear liquid. | |
| Total volatile content (percent): | |
| 24 hr. @ 158° F. | 1.0 |
| 24 hr. @ 212° F. | 1.0 |
| 24 hr. @ 250° F. | 1.0 |
| Approximate molecular weight | 5000 |

As an alternative, I may use as a liquid rubber constituent sulfonic groups. Chlorinated polyethylene suitable for my purpose may be prepared, for instance, by the chlorination of thermoplastic polyethylene followed by the introduction of chlorosulfonic groups by reacting the polymer with sulfur dioxide and chlorine, as well understood by the art. For my purpose, it is desirable that the polymer contain a minimum amount of branching and that the chlorine content be within the range from about 10% to about 70%, more advantageously, within the range of about 25% to about 35%. The proportion of chlorosulfonic groups present in the polymer should preferably be the equivalent of about 1.5% sulfur, based on the weight of the polymer. Optimum results are obtained where the molecular weight of the polyethylene, prior to chlorination, is within the range of about 15,000 to about 20,000.

As the curing agent for the liquid polysulfide rubber (polymercaptan resin), I may use any of the known curing agents for a rubber of this type, for instance, an organic or inorganic peroxide, such as benzoyl hydroperoxide, tertiary butyl hydroperoxide or tertiary butyl perbenzoate, cumene hydroperoxide, lead peroxide or zinc oxide.

Where the liquid rubber constituent used is the chlorinated polyethylene polymer described above, I use as the curing agent for that constituent any of the known curing agents for polymers of that type, for instance, organic or inorganic peroxides or oxides, such as magnesium oxide, lead oxide, cumene hydroperoxide, benzoyl hydroperoxide, and the like.

As previously noted herein, the stable two-phase co-curing system of my present invention is formulated by mixing with the epoxide resin the appropriate curing agent for the liquid rubber constituents while maintaining the epoxy resin component separate from the rubber component and separately mixing with the rubber constituent the curing agent for the epoxide resin.

The proportion of the respective curing agents mixed with the separate components is subject to considerable variation depending primarily upon the intended proportions of the respective components to be mixed and also depending somewhat upon the effectiveness of the particular curing agent with respect to the other component. The ratio of the epoxy resin constituent and the liquid rubber constituent to be mixed to form the ultimate plastic composition may be varied over a wide range without sacrificing all of the advantages of the invention. For example, these proportions may vary from 10% epoxy resin constituent and 90% rubber constituent to 90% epoxyl constituent and 10% rubber constituent depending upon the desired characteristics of the ultimate plastic composition.

The proportion of curing agent for the epoxy resin constituent may, with advantage, vary from about 8 parts to about 80 parts per 100 parts of the epoxy resin and the proportion of curing agent for the rubber constituent may vary from about 4 parts to about 50 parts per 100 parts of the rubber constituent. The proportion of curing agent to be premixed with the respective components may accordingly be varied depending upon the proportion in which the resin component and rubber component are to be mixed.

An essential characteristic of the liquid rubber constituent, used in accordance with my present invention, is that the rubber molecule must contain a group capable of reacting with the epoxide group of the resin constituent independently of the curing reaction of the individual constituents. It is this reaction between the rubber molecule and the epoxide resin which produces the necessary chemical network upon mixing and independently curing the constituents while so admixed. The hereinbefore named liquid rubbers possess that essential characteristic and I have found their use especially advantageous. However, this invention also contemplates the use of other liquid rubbers having the above-mentioned essential characteristic.

As previously noted, a solvent or plasticizer may be included in either of the two components. Such use is particularly desirable where one or the other component is insufficiently fluid to permit ready mixing. The use of such solvent in the epoxy resin component is usually necessary where the resinous material is solid or excessively viscous at normal temperature. The proportion of solvent so used is not particularly critical so long as the two components are sufficiently fluid to permit ready, uniform mixing at ambient temperature.

Upon mixing the resin component with the rubber component, the independent, simultaneous curing of the respective constituents is almost immediately initiated under ambient temperature conditions. The rate of cure may be effectively controlled by adjusting the pH of the mixture. The addition of a base material has been found to accelerate the cure and the addition of an acidic material serves to decelerate the cure. In this way, the period of time over which the plastic composition remains in a workable condition following mixing may be adjusted to only a few minutes or can be prolonged for several hours.

The invention will be further illustrated by the following specific examples. However, it is to be understood that the scope of the invention is not so restricted. The proportions specified in these examples are by weight.

EXAMPLE I

The two-component system of this example was formulated for producing a plastic composition in which the proportion of rubber constituent to epoxy resin constituent is 2 to 1, the two components A and B being mixed in equal proportions by weight. The liquid rubber component A was prepared by mixing 5 parts of diethylene triamine and 50 parts of calcium carbonate with 100 parts of polysulfide rubber of the type hereinbefore described and having a viscosity of about 40,000 cps. The resin component B was prepared by mixing 10 parts of cumene hydroperoxide with 50 parts of an epoxy resin produced by reacting epichlorohydrin with bisphenol A, i.e., bis(4-hydroxyphenyl)-dimethyl methane and having an epoxide equivalent of 195.

The two components, A and B, while kept separate, were found to be stable over long periods of time. However, upon mixing at the point of application under ambient temperature conditions, simultaneous curing of the respective constituents was immediately initiated. Before setting, the product was poured as a crack filler into horizontal joints, the workable period being approximately 10 minutes.

EXAMPLE II

The two-component system was prepared in accordance with the present example by mixing 7 parts of tri(dimethylaminomethyl)-phenol with 100 parts of the polysulfide rubber used in Example I, and separately mixing 7 parts of lead oxide with 70 parts of the epoxy resin used in Example I. So long as kept separate, the two components were stable but upon mixing in equal proportions, as in Example I, the curing of the respective components was initiated, resulting in a thermosetting plastic of extraordinary adhesive and cohesive characteristics. The working period of this composition was approximately one hour.

EXAMPLE III

Component A of this example was prepared by mixing 10 parts of fine silica and 60 parts of the herein described polyamide curing agent having an amine value of 215 and a Brookfield viscosity at 40° C. of 550, using the No. 6 spindle at 4 r.p.m., with 100 parts of the polysulfide resin of Example I. The resin component B was prepared by mixing 5 parts of fine silica and 12 parts of cumene hydroperoxide with 50 parts of the epoxide resin of Example I. Upon mixing these two components under ambient temperature conditions, there was produced a plastic suitable for applying to vertical or overhead joints and having a working period of approximately 10 minutes.

Where this experiment was carried out precisely as described above, except that 2.5 parts of oleic acid was included in the component A, the working period was increased to approximately 45 minutes.

EXAMPLE IV

The respective components of the system of this example were prepared from the following constituents and proportions thereof:

Component A:                                       Parts
    Chlorosulfonated chloroethylene polymer ----- 50
    Toluene ------------------------------------- 50
    Methyl-isobutyl-ketone ---------------------- 20
    Calcium carbonate --------------------------- 30
    Diethylene triamine ------------------------- 12
Component B:
    Epoxy resin --------------------------------- 100
    Lead oxide ---------------------------------- 5

The epoxy resin used in this example was substantially identical with that of Example I and the rubber polymer was that herein described having a chlorine content of about 27%, the chlorosulfonic group present in the polymer being equivalent to about 1.5% sulfur. In place of the toluene used in component A, I may, with advantage, use any other aromatic solvent, for instance, xylene, benzene or the like.

The two components were stable until mixed but upon mixing at ambient temperature, separate and independent curing of the components was initiated, the working period of the resultant plastic composition being approximately 30 minutes.

I claim:
1. The method for producing thermosetting plastic compositions which comprises simultaneously, independently curing a glycidyl polyether resin and a liquid rubber in intimate mixture by mixing together at ambient temperature the glycidyl polyether resin, premixed with a curing agent for the rubber, and the liquid rubber premixed with a curing agent selected from the group consisting of aliphatic amines, aromatic amines, and polyamides for the resin, the liquid rubber constituent being selected from the group consisting of (a) polysulfide rubber produced by reacting bis (2-chloroethyl) formal with sodium bisulfide in the presence of a small amount of trichloropropane, (b) polymercaptan resin having the following chemical structure

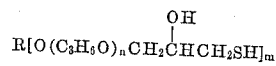

wherein $n$ is an integer from 20 to 25, $m$ is an integer from 2 to 3 and R is an aliphatic hydrocarbon radical, and (c) a chlorinated polyethylene containing chlorosulfonic groups having a chlorine content within the range of 25% to about 35% in which the rubber molecule contains a group capable of reacting with the epoxide group of the resin constituent.

2. A thermosetting plastic composition which is an ambient temperature reaction product of unreacted ingredients comprising two separate components, one component comprising a glycidyl polyether resin and the other component comprising a liquid rubber selected from the group consisting of (a) polysulfide rubber produced by reacting bis (2-chloroethyl) formal with sodium bisulfide in the presence of a small amount of trichloropropane, (b) polymercaptan resin having the following chemical structure

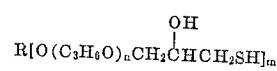

wherein $n$ is an integer from 20 to 25, $m$ is an integer from 2 to 3, and R is an aliphatic hydrocarbon radical, and (c) chlorinated polyethylene containing chlorosulfonic groups having a chlorine content within the range of about 25% to about 35%, the first component having admixed therewith a curing agent for the liquid rubber and the second component having admixed therewith a curing agent selected from the group consisting of aliphatic amines, aromatic amines, and polyamides for the glycidyl polyether resin.

3. The thermosetting plastic composition of claim 2 in which the resin constituent is one having an epoxide equivalent within the range of about 150 to about 500 and produced by reacting epichlorohydrin with bis-phenol A.

4. The thermosetting composition of claim 3 in which the liquid rubber constituent is a polysulfide rubber of the type produced by reacting bis(2-chloroethyl) formal with sodium bisulfide in the presence of a small amount of trichloropropane and having a viscosity of about 40,000 cps.

5. The thermosetting composition of claim 3 in which the liquid rubber constituent is a polymercaptan resin which has the following chemical structure

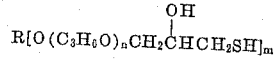

wherein $n$ is an integer from 20 to 25, $m$ is an integer from 2 to 3, and R is an aliphatic hydrocarbon radical.

6. The thermosetting plastic composition of claim 3 in which the rubber constituent is a chlorinated polyethylene ntaining chlorosulfonic groups, having a chlorine content within the range of about 25% to about 35%, and e proportion of chlorosulfonic groups present in the olymer being equivalent to about 1.5% sulfur, the mocular weight of the polyethylene prior to chlorination ing within the range from about 15,000 to about 20,000.

7. The thermosetting plastic composition of claim 2 in hich a filler is included in the rubber component.

8. The thermosetting plastic composition of claim 2 in hich a filler is included in the resin component.

References Cited by the Examiner
UNITED STATES PATENTS 3,258,495   6/1966   Le Fave _____ 260—609

FOREIGN PATENTS 1,316,600   12/1962   France.

MURRAY TILLMAN, *Primary Examiner.*

PAUL LIEBERMAN, *Examiner.*